(12) United States Patent
Chiba et al.

(10) Patent No.: US 12,408,099 B2
(45) Date of Patent: Sep. 2, 2025

(54) CONNECTION CHANGE RESTRICTION IN OVERLAPPING AREA OF TERRESTRIAL NETWORK AND NON-TERRESTRIAL NETWORK

(71) Applicant: RAKUTEN MOBILE, INC., Tokyo (JP)

(72) Inventors: Tsunehiko Chiba, Tokyo (JP); Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/797,103

(22) PCT Filed: Nov. 9, 2021

(86) PCT No.: PCT/JP2021/041153
§ 371 (c)(1),
(2) Date: Aug. 2, 2022

(87) PCT Pub. No.: WO2022/254741
PCT Pub. Date: Dec. 8, 2022

(65) Prior Publication Data
US 2024/0188022 A1 Jun. 6, 2024

(30) Foreign Application Priority Data

Jun. 3, 2021 (JP) ................................. 2021-093455
Jun. 14, 2021 (JP) ................................. 2021-098488

(51) Int. Cl.
*H04W 48/04* (2009.01)
*H04W 16/18* (2009.01)
(Continued)

(52) U.S. Cl.
CPC ........... *H04W 48/04* (2013.01); *H04W 16/18* (2013.01); *H04W 36/083* (2023.05);
(Continued)

(58) Field of Classification Search
CPC ..... H04W 48/04; H04W 60/04; H04W 68/02; H04W 68/12; H04W 84/06
See application file for complete search history.

(56) References Cited

U.S. PATENT DOCUMENTS

| | | |
|---|---|---|
| 5,862,480 A | 1/1999 | Wild et al. |
| 6,128,487 A | 10/2000 | Wiedeman |
| (Continued) | | |

FOREIGN PATENT DOCUMENTS

| | | | |
|---|---|---|---|
| EP | 1059826 A1 * | 12/2000 | ......... H04B 7/18563 |
| JP | H07226973 A | 8/1995 | |
| (Continued) | | | |

OTHER PUBLICATIONS

Office Action in JP Application No. 2023-525355, mailed Oct. 29, 2024, 7pp.

(Continued)

*Primary Examiner* — Elton Williams
(74) *Attorney, Agent, or Firm* — HAUPTMAN HAM, LLP

(57) ABSTRACT

A communication control apparatus includes: an overlapping area identification unit that identifies an overlapping area of a first location registration area including at least one terrestrial communication cell provided on the ground by a terrestrial base station installed on the ground and a second location registration area including at least one non-terrestrial communication cell provided on the ground by a flying non-terrestrial base station; a connection detection unit that detects that a communication device in the overlapping area is connected to one base station of the terrestrial base station and the non-terrestrial base station; and a connection change restriction unit that restricts change of connection destination of the communication device from the one base station to the other base station of the terrestrial base station and the (Continued)

non-terrestrial base station while the communication device is in the overlapping area.

9 Claims, 8 Drawing Sheets

(51) Int. Cl.
*H04W 36/08* (2009.01)
*H04W 36/30* (2009.01)
*H04W 60/04* (2009.01)
*H04W 68/02* (2009.01)
*H04W 68/12* (2009.01)
*H04W 84/06* (2009.01)

(52) U.S. Cl.
CPC ......... *H04W 36/305* (2018.08); *H04W 60/04* (2013.01); *H04W 68/02* (2013.01); *H04W 68/12* (2013.01); *H04W 84/06* (2013.01)

(56) References Cited

U.S. PATENT DOCUMENTS

| | | |
|---|---|---|
| 6,178,325 B1 | 1/2001 | Hazama |
| 6,208,857 B1 | 3/2001 | Agre et al. |
| 8,244,209 B2 | 8/2012 | Harvey et al. |
| 9,986,470 B2 | 5/2018 | Son et al. |
| 10,805,850 B1 | 10/2020 | Benammar et al. |
| 11,019,616 B2 | 5/2021 | Jiang et al. |
| 2011/0077002 A1 | 3/2011 | Dutta |
| 2012/0063317 A1 | 3/2012 | Muraoka et al. |
| 2014/0274195 A1 | 9/2014 | Singh et al. |
| 2016/0095000 A1 | 3/2016 | Duan et al. |
| 2016/0345189 A1 | 11/2016 | Miyagawa et al. |
| 2018/0241463 A1 | 8/2018 | Lu et al. |
| 2019/0124636 A1 | 4/2019 | Jiang et al. |
| 2021/0099933 A1 | 4/2021 | Matsuda et al. |
| 2021/0297923 A1 | 9/2021 | Wei et al. |
| 2021/0306424 A1 | 9/2021 | Anvari |
| 2022/0052753 A1 | 2/2022 | Speidel et al. |
| 2022/0232465 A1 | 7/2022 | Tsuda |
| 2022/0295444 A1 | 9/2022 | Wu et al. |
| 2022/0394579 A1 | 12/2022 | Fujishiro |
| 2024/0023066 A1 | 1/2024 | Wei et al. |

FOREIGN PATENT DOCUMENTS

| | | |
|---|---|---|
| JP | H9116949 A | 5/1997 |
| JP | 2000209650 A | 7/2000 |
| JP | 2002330464 A | 11/2002 |
| JP | 2003158762 A | 5/2003 |
| JP | 2010278886 A | 12/2010 |
| JP | 2013157974 A | 8/2013 |
| JP | 2017139537 A | 8/2017 |
| JP | 2018056897 A | 4/2018 |
| JP | 2021061642 A | 4/2021 |
| WO | 2019193891 A1 | 10/2019 |
| WO | 2020030713 A2 | 2/2020 |
| WO | 2020230511 A1 | 11/2020 |
| WO | 2021075225 A1 | 4/2021 |

OTHER PUBLICATIONS

Sattarzadeh, Ata et al. "Satellite-based non-terrestrial networks in 5G: Insights and challenges." IEEE Access 10 (2021): 11274-11283. (Year: 2021), 10pp.

Office Action in U.S. Appl. No. 17/916,797, dated Dec. 16, 2024, 24pp.

Office Action in IN Application No. 202347088108, mailed Jun. 23, 2025, 5pp.

Office Action in IN Application No. 202347089008, mailed Jun. 25, 2025, 6pp.

* cited by examiner

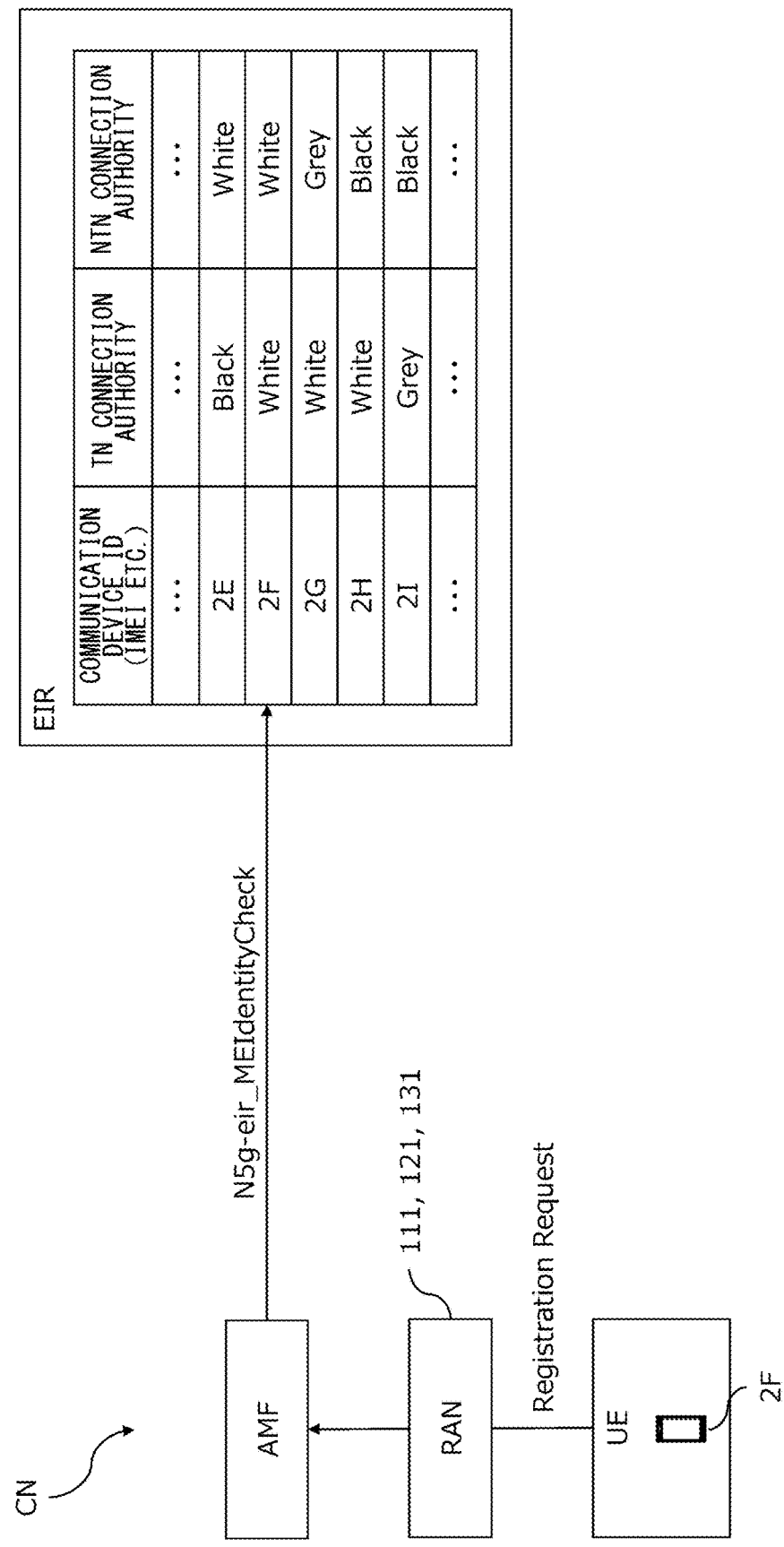

CONNECTION CHANGE RESTRICTION IN OVERLAPPING AREA OF TERRESTRIAL NETWORK AND NON-TERRESTRIAL NETWORK

RELATED APPLICATIONS

This application is a National Stage of PCT international application No. PCT/JP2021/041153 filed on Nov. 9, 2021, which claims priority to Japanese application No. 2021-093455 filed on Jun. 3, 2021 and Japanese application No. 2021-098488 filed on Jun. 14, 2021.

BACKGROUND OF THE INVENTION

1. Field of the Invention

The present disclosure relates to communication control technology in communication system.

2. Description of the Related Art

The number, types, and applications of wireless communication devices, represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Mobile communication networks for mobile or portable communication devices such as smartphones and cell phones (hereinafter collectively referred to as "communication device (s)") are usually constructed by communication cells (hereinafter referred to as "terrestrial communication cell (s)") provided by base stations installed on the ground (hereinafter referred to as "terrestrial base station (s)"). However, in some areas, it was difficult to install a sufficient number of terrestrial base stations for various reasons, resulting in a relatively low quality of mobile communications.

In order to solve the problem of the disparity in mobile communication quality among different regions and the so-called "out-of-range" problem, where mobile communication devices cannot communicate in some regions, non-terrestrial networks (NTN) have been considered. In NTN, communication satellites or unmanned aircrafts flying in outer space or the atmosphere, such as the stratosphere, are used as base stations (hereinafter referred to as non-terrestrial base station (s), and especially communication satellites are referred to as satellite base station (s)). The non-terrestrial base station provides a communication cell on the ground (hereinafter referred to as non-terrestrial communication cell (s), and especially communication cells provided by communication satellites are referred to as satellite communication cell (s)). A communication device in a non-terrestrial communication cell communicates with a non-terrestrial base station directly or indirectly via other communication devices. By providing non-terrestrial communication cells in areas where terrestrial communication cells are not sufficient, the quality of mobile communication in such areas can be improved.

Patent Literature 1: JP-A-2010-278886

SUMMARY OF THE INVENTION

In a mobile communication system, a location registration area or a tracking area (TA) is provided to track or detect the approximate location of a communication device. The location registration area is composed of one or more base stations, and the entire area of each communication cell provided on the ground by each base station corresponds to the location registration area. For example, one mobile network operator (MNO) in Japan covers the entire country with several tens of location registration areas.

When a communication device moves across the boundaries of multiple location registration areas, an area change notification or location registration area update notification (TA Update: Tracking Area Update) is generated to notify the core network of the mobile communication system that the location registration area where the communication device is located has changed. In a communication system in which a terrestrial network (TN) composed of terrestrial base stations and a non-terrestrial network (NTN) composed of non-terrestrial base stations coexist, the location registration area to which a terrestrial base station belongs (hereinafter referred to as the first location registration area) and the location registration area to which a non-terrestrial base station belongs (hereinafter referred to as the second location registration area) may overlap. In the case where the connection destination of the communication device in the overlapping area is frequently switched between a terrestrial base station and a non-terrestrial base station, an area change notification is generated each time.

The present disclosure was made in consideration of this situation, and its purpose is to provide a communication control apparatus etc. that can prevent frequent changes of the location registration area or frequent area change notifications in the overlapping area of terrestrial communication cell and non-terrestrial communication cell.

In order to solve the above problem, a communication control apparatus in a certain aspect of the present disclosure comprises: an overlapping area identification unit that identifies an overlapping area of a first location registration area including at least one terrestrial communication cell provided on the ground by a terrestrial base station installed on the ground and a second location registration area including at least one non-terrestrial communication cell provided on the ground by a flying non-terrestrial base station; a connection detection unit that detects that a communication device in the overlapping area is connected to one base station of the terrestrial base station and the non-terrestrial base station; and a connection change restriction unit that restricts change of connection destination of the communication device from the one base station to the other base station of the terrestrial base station and the non-terrestrial base station while the communication device is in the overlapping area.

In this aspect, the connection change restriction unit restricts the change of the connection destination of the communication device in the overlapping area of the terrestrial communication cell and the non-terrestrial communication cell, so that the frequent change of the location registration area in the overlapping area can be prevented.

Another aspect of the present disclosure is also a communication control apparatus. The communication control apparatus comprises: an overlapping area identification unit that identifies an overlapping area of a first location registration area including at least one terrestrial communication cell provided on the ground by a terrestrial base station installed on the ground and a second location registration area including at least one non-terrestrial communication cell provided on the ground by a flying non-terrestrial base station; a connection history information retention unit that retains connection history information to the one base station, when the connection destination of the communication device in the overlapping area is changed from one base station to other base station of the terrestrial base station and the non-terrestrial base station; and an area change notification unit that generates an area change notification when the location registration area to which the communication device is connected is changed, and does not generate an area change notification when the connection destination of the communication device in the overlapping area is changed from the other base station to the one base station for which the connection history information is retained.

In this aspect, when the connection destination of a communication device in an overlapping area of a terrestrial communication cell and a non-terrestrial communication cell is changed from the one base station to the other base station and then changed again to the one base station, the area change notification is not generated based on the connection history information retained by the connection history information retention unit, so that the In this way, the frequent area change notifications in the overlapping area can be prevented.

Further another aspect of the present disclosure is a communication control method. The communication control method comprises: identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station; detecting that a communication device in the overlapping area is connected to one base station of the terrestrial base station and the non-terrestrial base station; and restricting change of connection destination of the communication device from the one base station to the other base station of the terrestrial base station and the non-terrestrial base station while the communication device is in the overlapping area.

Further another aspect of the present disclosure is also a communication control method. The communication control method comprises: identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station; retaining connection history information to the one base station, when the connection destination of the communication device in the overlapping area is changed from one base station to other base station of the terrestrial base station and the non-terrestrial base station; and generating an area change notification when the location registration area to which the communication device is connected is changed, and not generating an area change notification when the connection destination of the communication device in the overlapping area is changed from the other base station to the one base station for which the connection history information is retained.

In addition, any combination of the above components, and any conversion of the expression of the present disclosure among methods, devices, systems, recording media, computer programs, and the like, is also valid as a form of the present disclosure.

According to the present disclosure, frequent changes of the location registration area or frequent area change notifications in the overlapping area of terrestrial communication cell and non-terrestrial communication cell can be prevented.

BRIEF DESCRIPTION OF THE DRAWINGS

FIG. 8 schematically shows the process of registering and managing a communication device in the EIR by the communication device administration unit.

DETAILED DESCRIPTION OF THE INVENTION

Figure 1:
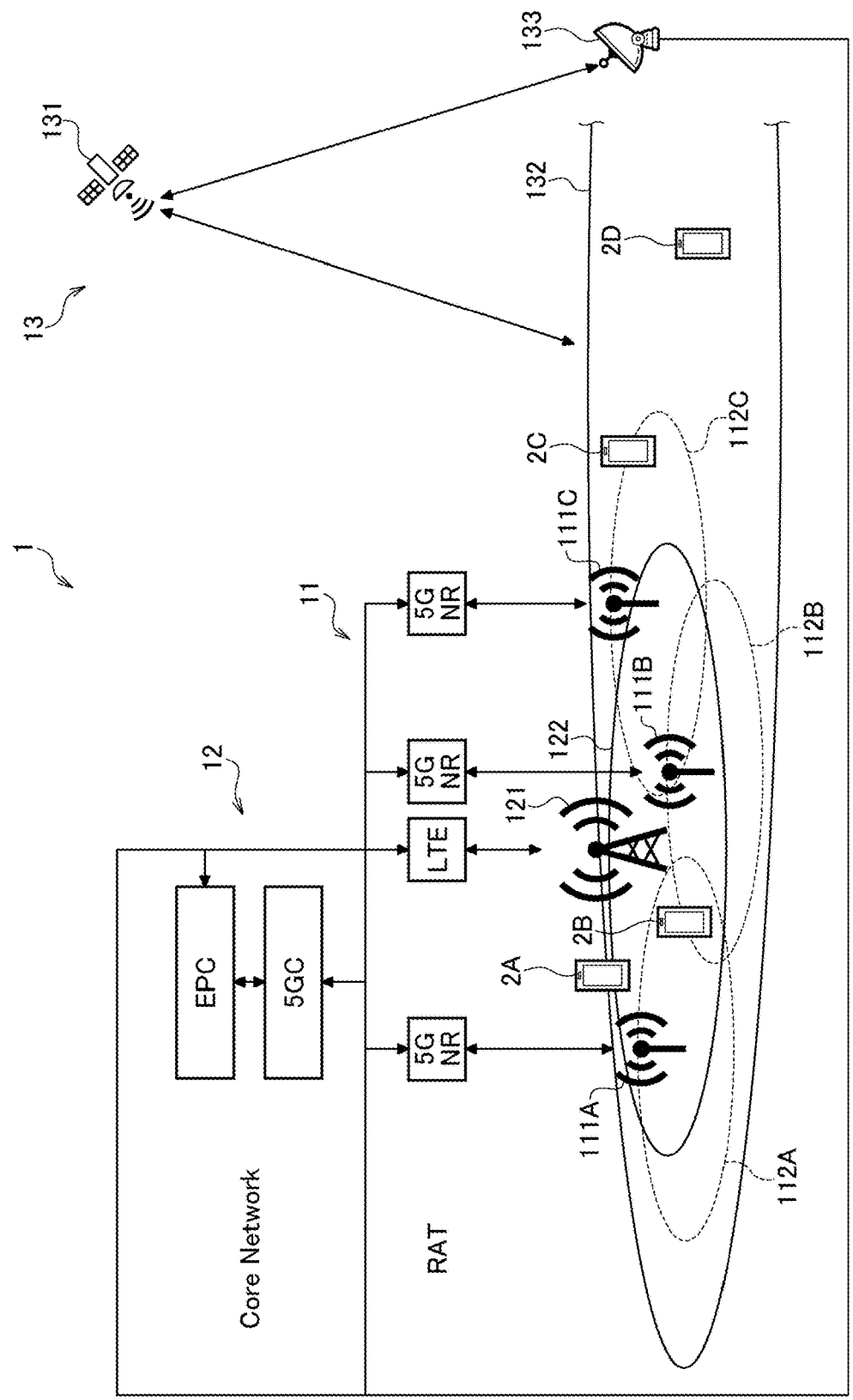
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B, and 111C (hereinafter collectively referred to as 5G base station 111) installed on the ground capable of communicating by 5G NR with communication devices or communication devices 2A, 2B, 2C, and 2D (hereinafter collectively referred to as communication device (s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 comprises a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similarly to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality etc., under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similarly to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similarly to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft etc. with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base stations 121 as terrestrial base stations that constitute the terrestrial network (TN). In this way, the gateway 133 connects the non-terrestrial network (NTN), which is comprising communication satellites 131, and the terrestrial network TN, which is comprising terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In this way, appropriate coordination is made between different wireless communication systems such as 5G wireless communication system 11, 4G wireless communication system 12, satellite communication system 13 etc. through the gateway 133.

Satellite communication by communication satellites 131 is mainly used for covering areas with no or few terrestrial base stations such as 5G base stations 111 and 4G base stations 121 etc. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D etc. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2, 800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft flying in stratosphere or other lower (e.g. about 20 km above the ground) atmosphere may be used as a non-terrestrial base station in addition to or instead of the communication satellite 131.

As described above, the wireless communication system 1 according to the present embodiment includes the terrestrial network (TN) 11, 12, capable of communicating with communication device 2 in the terrestrial communication cell 112, 122 provided on the ground by terrestrial base station 111, 121 installed on the ground, and the non-terrestrial network (NTN) 13, capable of communicating with communication device 2 in the non-terrestrial communication cell 132 provided on the ground by flying non-terrestrial base station 131. The communication control apparatus according to the present embodiment controls the TN and the NTN.

In the following, a plurality of embodiments for implementing the present disclosure will be described individually with common reference to FIG. 2. As long as the processes and effects of each embodiment are not prevented, all or some of the components of each embodiment can be combined as desired. In addition, components common or similar to multiple embodiments are assigned the same sign to omit redundant explanations.

Figure 2:
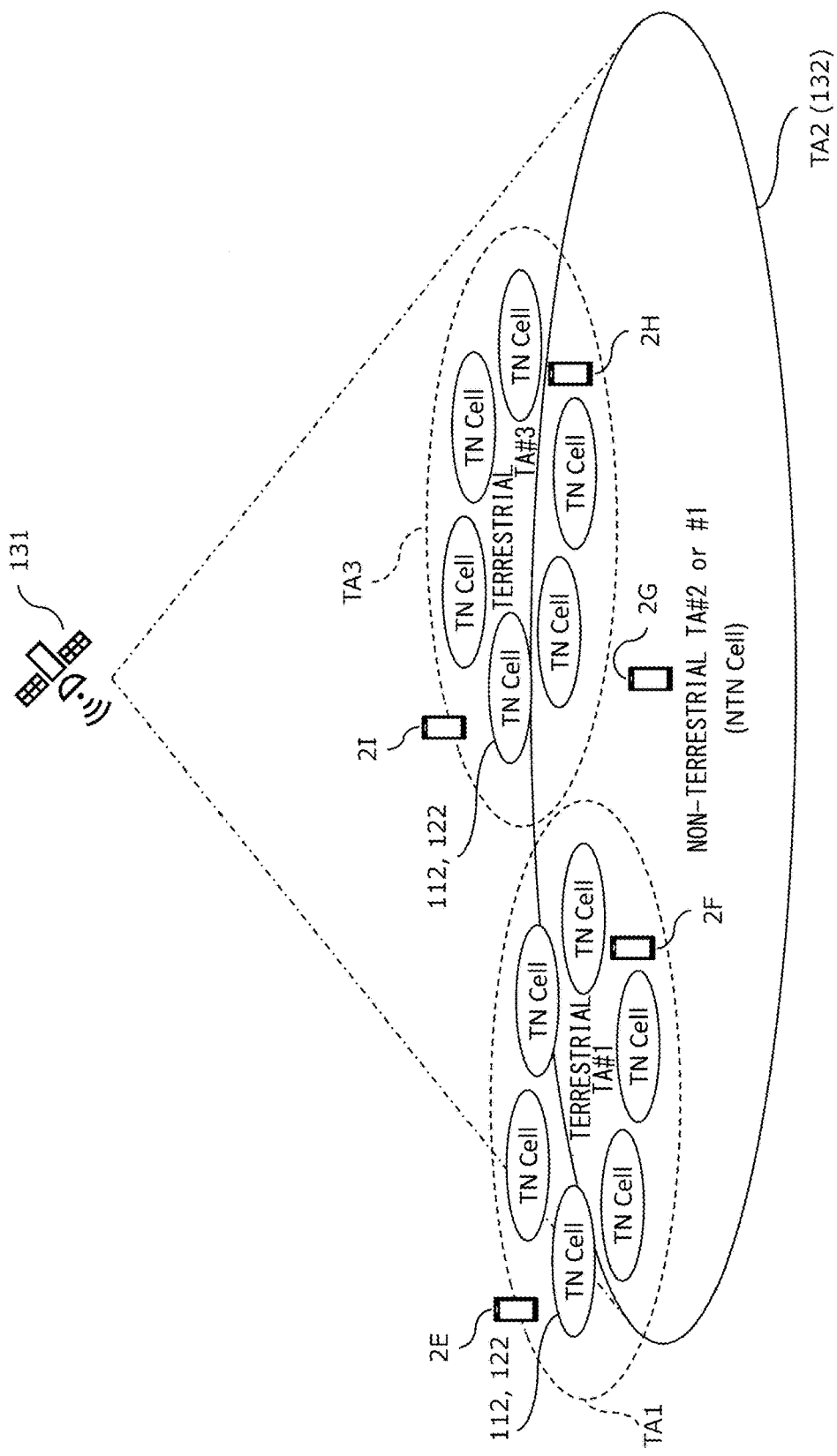
FIG. 2 schematically shows an example of a location registration area composed of terrestrial communication cell and non-terrestrial communication cell.

FIG. 2 schematically shows an example of a location registration area or tracking area (denoted as "TA" in FIG. 2) composed of the terrestrial communication cells 112 and 122 (denoted as "TN Cell" in FIG. 2) provided on the ground by terrestrial base stations 111 and 121 installed on the ground and non-terrestrial communication cells 132 (denoted as "NTN Cell" in FIG. 2) provided on the ground by flying non-terrestrial base stations 131. The first location registration area TA1 is composed of one or more (multiple in FIG. 2) geographically adjacent or nearby terrestrial communication cells 112, 122. The second registration area TA2 is composed of one or more (one in FIG. 2) geographically adjacent or nearby non-terrestrial communication cells 132. The third location registration area TA3 is composed of one or more (multiple in FIG. 2) geographically adjacent or nearby terrestrial communication cells 112, 122.

Each location registration area TA1 to TA3 is assigned a code or ID that uniquely identifies the location registration area, which is called TAC (Tracking Area Code) and simply denoted as "#1" to "#3" in FIG. 2. Specifically, the TAC or ID of the first location registration area TA1 is "#1", the TAC or ID of the second location registration area TA2 is "#2", and the TAC or ID of the third location registration area TA3 is "#3". However, as described below, the TAC or ID of the second location registration area TA2 may be set to "#1", the same as the first location registration area TA1. In this way, one location registration area may include communication cells of different types (terrestrial communication cells 112, 122 and non-terrestrial communication cell 132). In the example of FIG. 2, the communication device 2E is in the first location registration area TA1, the communication device 2F is in the overlapping area of the first location registration area TA1 and the second location registration area TA2, the communication device 2G is in the second location registration area TA2, the communication device 2H is in the overlapping area of the second location registration area TA2 and the third location registration area TA3, and the communication device 2I is in the third location registration area TA3 (In the following, communication devices 2E to 2I are also collectively referred to as communication device (s) 2).

Figure 3:
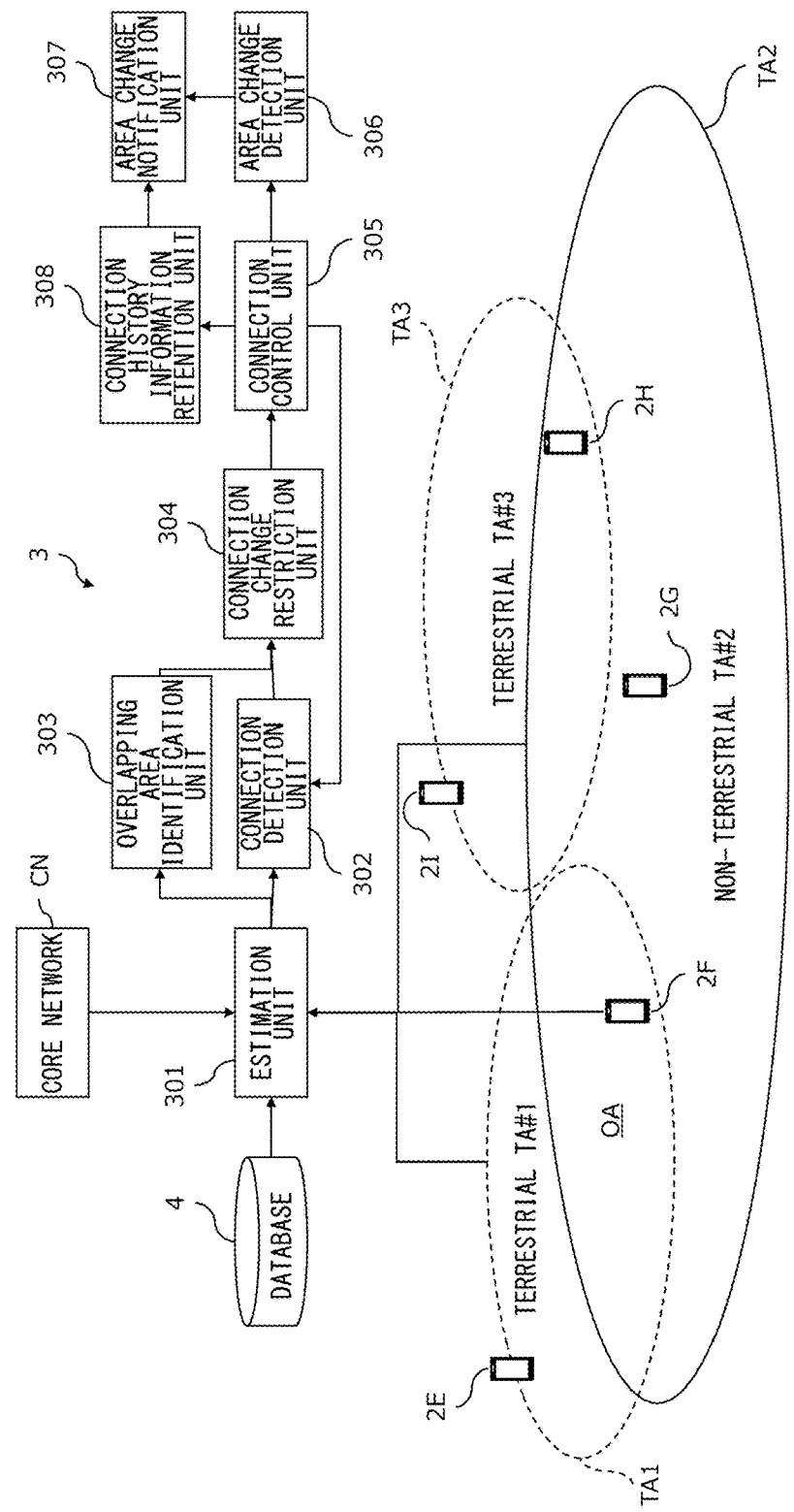
FIG. 3 is a functional block diagram of the communication control apparatus of the first embodiment.

FIG. 3 is a functional block diagram of the communication control apparatus 3 of the first embodiment. The communication control apparatus 3 has an estimation unit 301, a connection detection unit 302, an overlapping area identification unit 303, a connection change restriction unit 304, a connection control unit 305, an area change detection unit 306, an area change notification unit 307, and a connection history information retention unit 308. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in this embodiment, some or all of functional blocks of the communication control apparatus 3 may be realized in a distributed or centralized manner by computer and/or processor provided in the communication device 2 (e.g. 2F), the terrestrial base stations 111, 121, the non-terrestrial base station 131, and the core network CN (all of these are shown as separate entities in FIG. 3 for convenience).

In this embodiment, the first location registration area TA1, which is composed of terrestrial base stations, and the second location registration area TA2, which is composed of non-terrestrial base stations, are assigned different TAC or ID "#1" and "#2" respectively. In other words, the terrestrial communication cells provided on the ground by the terrestrial base station and the non-terrestrial communication cells provided on the ground by the non-terrestrial base station belong to different location registration areas TA1 and TA2 respectively. In this case, the communication device 2F in the overlapping area OA of the first location registration area TA1 and the second location registration area TA2 can communicate with both the terrestrial base station in the first location registration area TA1 and the non-terrestrial base station in the second location registration area TA2. If the connection destination of the communication device 2F in the overlapping area OA is frequently switched between the terrestrial base station and the non-terrestrial base station, the location registration area to which the communication device 2F belongs is changed each time, and the area change notification by the area change notification unit 307 described below is issued frequently. The communication control apparatus 3 of this embodiment prevents such frequent changes of the location registration area or frequent area change notifications in the overlapping area OA of terrestrial communication cells and non-terrestrial communication cells.

The estimation unit 301 estimates the connection status of the communication device 2F in the overlapping area OA (e.g. to which of the terrestrial base stations or non-terrestrial base stations the communication device 2F is connected) and its location (e.g. whether or not the communication device 2F is in the overlapping area OA). The estimation unit 301 acquires information indicating the connection status and/or location of the communication device 2F in the overlapping area OA from the communication device 2 (2F etc.), terrestrial base stations that constitute the first location registration area TA1, non-terrestrial base stations that constitute the second location registration area TA2, core network CN, any kind of database 4 outside the wireless communication system 1 etc.

For example, the information indicating the connection status and/or location of the communication device 2F in the overlapping area OA may be obtained from the NWDAF (Network Data Analytics Function) and/or the LMF (Location Management Function) introduced in the 5GC as the core network CN of 5G. The NWDAF is responsible for collecting and analyzing data on the network including 5G network. Specifically, NWDAF collects and accumulates activity history data (including history information on the base station to which the communication device 2 was connected and the location of the communication device 2) on various activities performed on the network by a number of communication devices 2 connected to the network, and utilizes the analysis results for traffic control on the network, for example. The LMF manages the physical location of each communication device 2 on the network including 5G network. In other wireless communication systems, including those of later generations than 5G, functions similar to NWDAF and/or LMF might be provided under different names. Such similar functions may be used in this embodiment in place of or in addition to NWDAF and/or LMF.

The database 4 outside the wireless communication system 1 includes a server used by service providers that provide map services and/or location tracking services for a large number of communication device 2 connected to the network, and the information indicating the location etc. of the communication device 2F in the overlapping area OA may be also obtained from such database 4. In these services, location data of a large number of communication device 2 connected to the network is collected and stored from GPS modules etc., and based on the analysis of the data, data on congestion level for each time period in each area, for example, is generated and utilized for service quality improvement etc.

As described above, from the core network CN (NWDAF etc.) and/or the database 4, statistical information on the activities on the network by mainly an unspecified number of communication devices 2 (including statistical information on the base stations to which they are connected) and/or historical information on the physical locations of mainly an unspecified number of communication devices 2 can be acquired. In the example of FIG. 3, the congestion level, communication traffic, and other activity history information for each time period in the overlapping area OA and the non-overlapping area (e.g. areas where the communication devices 2E, 2G are located) respectively, can be acquired by the estimation unit 301 from the core network CN and/or the database 4 as the information indicating the current connection status and/or current location of the communication device 2F in the overlapping area OA. For example, during the time period when the estimation unit 301 estimates the current connection status and/or current location of the communication device 2F, if the activity history information from the core network CN and/or the database 4 suggests that the number and/or communication volume of the communication devices 2 in the overlapping area OA are higher on average than the number and/or communication volume of the communication devices 2 in the non-overlapping area and/or that most of the communication devices 2 in the overlapping area OA were connected to the terrestrial base stations, it can be presumed that the communication device 2F is likely to be in the overlapping area OA and be connected to the terrestrial base station (the first location registration area TA1).

In the case where the activity history information of the communication device 2F itself can be obtained from the communication device 2F itself, terrestrial base stations that constitute the first location registration area TA1, non-terrestrial base stations that constitute the second location registration area TA2, core network CN, database 4 etc., in addition to or instead of the activity history information of an unspecified number of communication devices 2 from the core network CN and/or the database 4, it is possible to accurately estimate the connection status and/or the location of the communication device 2F. For example, during the time period when the estimation unit 301 estimates the current connection status and/or current location of the communication device 2F, if the acquired activity history information suggests that the communication device 2F was more frequently in the overlapping area OA than in non-overlapping area in the past and/or that the communication device 2F in the overlapping area OA was more frequently connected to the terrestrial base stations than the non-terrestrial base stations in the past, it can be presumed that the communication device 2F is highly likely to be in the overlapping area OA and be connected to the terrestrial base station (the first location registration area TA1).

In addition to or instead of the activity history information on past days, the activity history information of the communication device 2F immediately before (e.g. within one hour) the estimation unit 301 estimates the current connection status and/or current location of the communication device 2F may be used. For example, if the acquired activity history information suggests that the communication device 2F was in the overlapping area OA and connected to the terrestrial base station within 30 minutes before the estimation unit 301 estimates the current connection status and/or current location of the communication device 2F, it can be presumed that the communication device 2F is highly likely to remain in the overlapping area OA and be connected to the terrestrial base station (the first location registration area TA1).

In contrast to the NWDAF and/or the database 4, which collect activity history information of mainly an unspecified number of communication devices 2, the LMF can collect statistical information on the activities on the network by the specific communication device 2F and/or historical information on the physical locations of the specific communication device 2F. For example, during the time period when the estimation unit 301 estimates the current connection status and/or current location of the communication device 2F, if the activity history information acquired from the LMF suggests that the communication device 2F was more frequently in the overlapping area OA than in non-overlapping area in the past and/or that the communication device 2F in the overlapping area OA was more frequently connected to the terrestrial base stations than the non-terrestrial base stations in the past, it can be presumed that the communication device 2F is highly likely to be in the overlapping area OA and be connected to the terrestrial base station (the first location registration area TA1). And, if the activity history information acquired from the LMF suggests that the communication device 2F was in the overlapping area OA and connected to the terrestrial base station within 30 minutes before the estimation unit 301 estimates the current connection status and/or current location of the communication device 2F, it can be presumed that the communication device 2F is highly likely to remain in the overlapping area OA and be connected to the terrestrial base station (the first location registration area TA1). The activity history information of the specific communication device 2F as described above can be obtained from the GPS module or memory implemented in the communication device 2F, terrestrial base stations that constitute the first location registration area TA1, non-terrestrial base stations that constitute the second location registration area TA2 etc. by the estimation unit 301 directly.

If the connection status of the communication device 2F, which is the target of the estimation of the estimation unit 301, can be directly recognized in real time from the connection control unit 305 described below, the estimation unit 301 may not need to estimate the connection status of the communication device 2F. In the same way, if the location of the communication device 2F, which is the target of the estimation of the estimation unit 301, can be directly recognized in real time from the GPS module etc. implemented in the communication device 2F, the estimation unit 301 may not need to estimate the location of the communication device 2F.

The connection detection unit 302 detects whether the communication device 2F in the overlapping area OA is connected to a terrestrial base station that constitutes the first location registration area TAL or a non-terrestrial base station that constitutes the second location registration area TA2. The connection detection unit 302 may detect the base station to which the communication device 2F in the overlapping area OA is connected, based on the connection status of the communication device 2F estimated by the estimation unit 301 and/or the real-time connection status of the communication device 2F recognized by the connection control unit 305.

The overlapping area identification unit 303 identifies the overlapping area OA of the first location registration area TA1 and the second location registration area TA2, and detects whether the communication device 2F is in the overlapping area OA. The overlapping area identification unit 303 may judge whether the communication device 2F is in the overlapping area OA, based on the location of the communication device 2F estimated by the estimation unit 301 and/or the real-time location of the communication device 2F recognized by the GPS module etc. implemented in the communication device 2F.

The connection change restriction unit 304 restricts change of connection destination of the communication device 2F from the one base station to the other base station of the terrestrial base station that constitutes the first location registration area TA1 and the non-terrestrial base station that constitutes the second location registration area TA2, while it is confirmed by the overlapping area identification unit 303 that the communication device 2F is in the overlapping area OA. For example, the connection change restriction unit 304 rejects at least one request for changing the connection destination to the other base station received from the communication device 2F in the overlapping area OA. In addition, the connection change restriction unit 304 may notify the communication device 2F in the overlapping area OA that the location registration area that includes the other base station is a transition prohibited area.

Specifically, when the communication device 2F in the overlapping area OA is connected on the terrestrial base station that constitutes the first location registration area TA1, the change of the connection destination of the communication device 2F to the non-terrestrial base station that constitutes the second location registration area TA2 is restricted. Conversely, when the communication device 2F in the overlapping area OA is connected on the non-terrestrial base station that constitutes the second location registration area TA2, the change of the connection destination of the communication device 2F to the terrestrial base station that constitutes the first location registration area TAL is restricted. This restricts the change of the base station type of the connection destination which directly leads to the change of the location registration area while the communication device 2F is confirmed to be in the overlapping area OA. In this way, this embodiment can prevent frequent changes of the location registration area in the overlapping area OA and frequent area change notifications by the area change notification unit 307 described below.

The connection control unit 305 connects each communication device 2 to each base station, and according to changes in the communication quality of each base station and/or the movement of each communication device 2, changes the base station to be connected by each communication device 2. As for the communication device 2F in the overlapping area OA, the change of the base station type in the overlapping area OA is restricted as described above. However, when the communication quality of the base station of the one type being connected by the communication device 2F within the overlapping area OA deteriorates extremely, or when the communication device 2F moves outside the overlapping area OA (detected by the overlapping area identification unit 303), it is allowed to change the connection destination to the base station of the other type.

The area change detection unit 306 detects a change of the location registration area to which each communication device 2 is connected. For example, if the communication device 2F that was connected to the terrestrial base station that constitutes the first location registration area TA1 in the overlapping area OA moves outside the overlapping area OA and to the area outside the first location registration area TA1 and inside the second location registration area TA2, the connection control unit 305 shall connect the communication device 2F to the non-terrestrial base station that constitutes the second location registration area TA2. In this case, the location registration area to which the communication device 2F is connected is changed from the first location registration area TA1 to the second location registration area TA2, which is detected by the area change detection unit 306.

When a change of the location registration area connected by each communication device 2 is detected by the area change detection unit 306, the area change notification unit 307 generates an area change notification (TA Update). The area change detection unit 306 and the area change notification unit 307 are typically provided in the communication device 2F. Specifically, the communication device 2F recognizes that it is connected to the second location registration area TA2 based on the TAC "#2" included in the notification information transmitted by the non-terrestrial base station to which the connection has been changed. And, the communication device 2F detects that its connected location registration area has been changed (area change detection unit 306) based on the difference between the TAC "#2" and the TAC "#1" of the first location registration area TA1 included in the notification information transmitted by the terrestrial base station from which the connection has been changed. Then, the communication device 2F notifies the core network CN of the change of its connected location registration area in the form of an area change notification (area change notification unit 307).

The connection history information retention unit 308 retains connection history information to the base station of the one type, when the connection destination of the communication device 2F in the overlapping area OA is changed from the base station of the one type (e.g. terrestrial base station) to the base station of the other type (e.g. non-terrestrial base station). The connection history information retention unit 308, which is typically provided in the communication device 2F, retains the connection history information indicating that the communication device 2F has been connected to the base station of the one type for at least a predetermined period of time. The area change notification unit 307 does not generate an area change notification, when the connection destination of the communication device 2F is changed again from the base station of the other type to the base station of the one type for which the connection history information is retained, while the connection history information is being retained by the connection history information retention unit 308 and while it is confirmed by the overlapping area identification unit 303 that the communication device 2F is in the overlapping area OA. For example, when the connection destination of the communication device 2F in the overlapping area OA is changed from a terrestrial base station to a non-terrestrial base station and then changed again to a terrestrial base station, the area change notification from the second location registration area TA2 (non-terrestrial base station) to the first location registration area TA1 (terrestrial base station) will not be issued, based on the connection history information retained by the connection history information retention unit 308. In this way, the frequent area change notifications in the overlapping area OA can be prevented.

Figure 4:
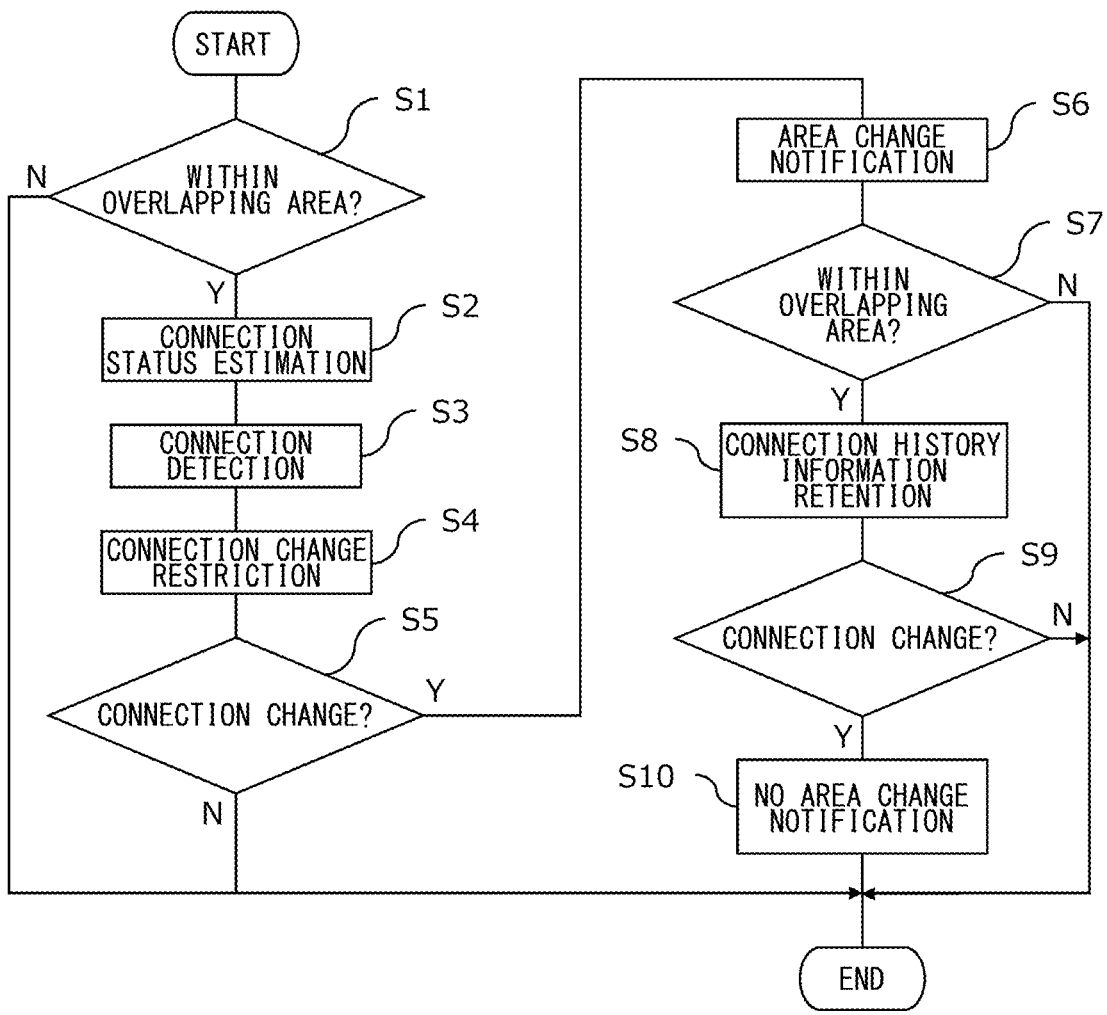
FIG. 4 is a flowchart illustrating communication control processes of the communication control apparatus of the first embodiment.

FIG. 4 is a flowchart showing the communication control process of the communication control apparatus 3 of the first embodiment. In the flowcharts, "S" means a step or a process. In S1, the overlapping area identification unit 303 identifies the overlapping area OA of the first location registration area TA1 and the second location registration area TA2, and judges whether or not the communication device 2F is in the overlapping area OA. If the judgement in S1 is Yes, then proceed to S2, and the estimation unit 301 shall estimate the connection status of the communication device 2F in the overlapping area OA. In S3, the connection detection unit 302 detects whether the communication device 2F in the overlapping area OA is connected to a terrestrial base station that constitutes the first location registration area TAL or a non-terrestrial base station that constitutes the second location registration area TA2, based on the connection status of the communication device 2F estimated in S2 and/or the real-time connection status of the communication device 2F recognized by the connection control unit 305.

In S4, the connection change restriction unit 304 restricts change of connection destination of the communication device 2F from the one base station to the other base station of the terrestrial base station that constitutes the first location registration area TA1 and the non-terrestrial base station that constitutes the second location registration area TA2, while it is confirmed by S1 that the communication device 2F is in the overlapping area OA. In S5, the connection control unit 305 judges whether or not the base station to which the communication device 2F is connected has been changed. If the judgement in S5 is Yes, then proceed to S6, and the area change detection unit 306 detects the change of the location registration area to which the communication device 2F is connected, and the area change notification unit 307 generates an area change notification (TA Update). In S7, the overlapping area identification unit 303 judges whether or not the communication device 2F is in the overlapping area OA.

If the judgement in S7 is No, the change of the connected base station in S5 occurred because the communication device 2F has moved outside the overlapping area OA. If the judgement in S7 is Yes, the change of the connected base station in S5 occurred while the communication device 2F remains in the overlapping area OA. In this case, in the following S8, the connection history information retention unit 308 generates and retains the connection history information indicating that the communication device 2F in the overlapping area OA was connected to the base station of the one type before the change of the connection destination in S5. In S9, the connection control unit 305 judges whether or not the base station to which the communication device 2F is connected in the overlapping area OA has been changed again. If the judgement in S9 is Yes, then proceed to S10, and the area change notification unit 307 does not generate an area change notification following the change of the connection destination in S9, while the connection history information generated in S8 is retained by the connection history information retention unit 308.

Figure 5:
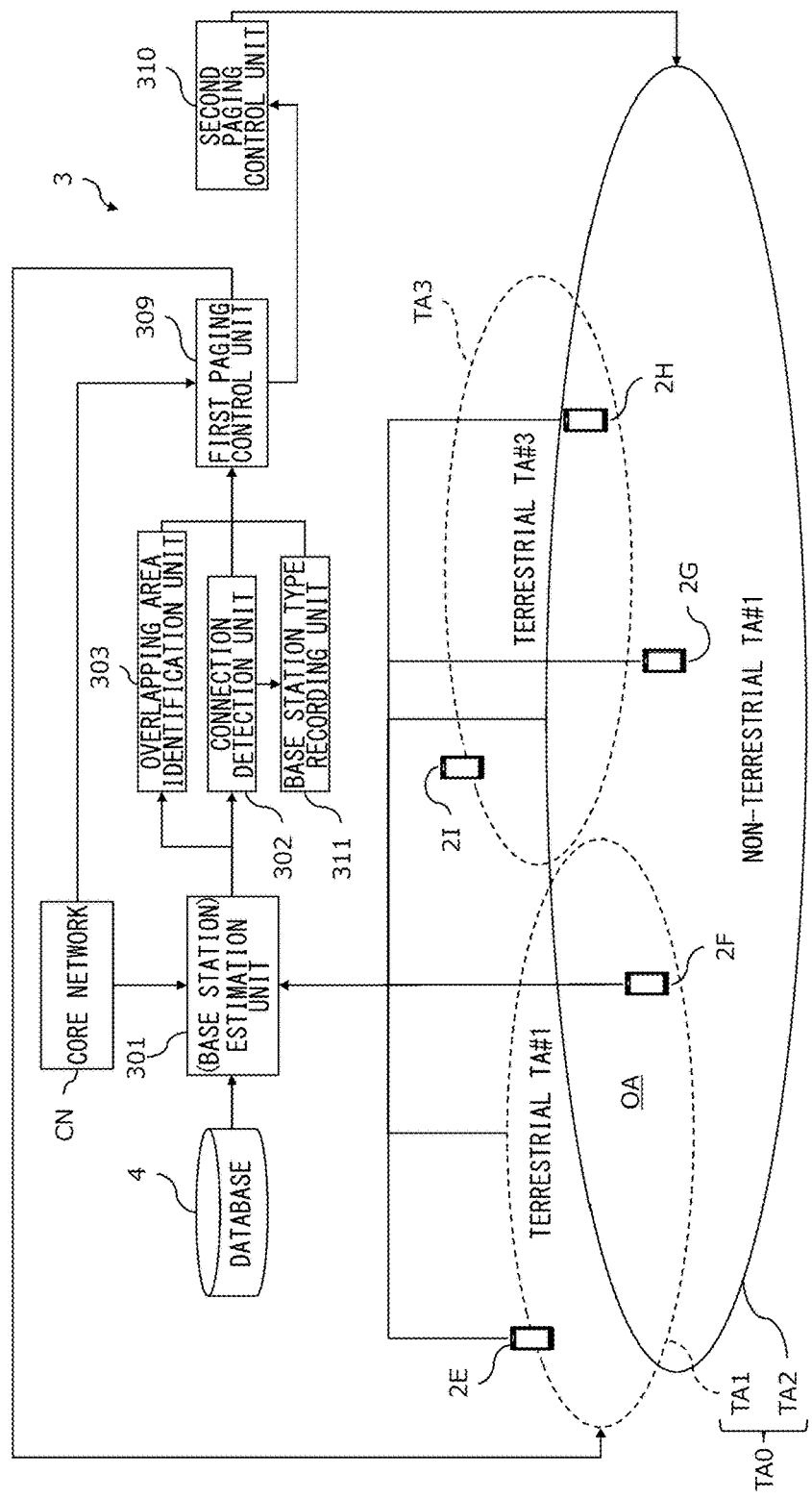
FIG. 5 is a functional block diagram of the communication control apparatus of the second embodiment.

FIG. 5 is a functional block diagram of the communication control apparatus 3 of the second embodiment. The communication control apparatus 3 comprises an estimation unit 301, a connection detection unit 302, and an overlapping area identification unit 303, similar to those in the first embodiment (FIG. 3), and additionally comprises a first paging control unit 309, a second paging control unit 310, and a base station type recording unit 311. Duplicate descriptions of functional blocks common to the first embodiment will be omitted.

In this embodiment, the first location registration area TA, which is composed of terrestrial base stations 112 and 122, and the second location registration area TA2, which is composed of non-terrestrial base stations 132, are assigned the same TAC or ID "#1". In other words, the first location registration area TA1 and the second location registration area TA2 constitute one large integrated location registration area TA0 with the TAC or ID of "#1" assigned to it.

In general, when making a call or delivering a short message to a communication device in a location registration area, a paging signal to call the communication device is transmitted simultaneously from all base stations in the location registration area. Therefore, the paging signal to call communication devices 2E, 2F, 2G and 2H in the integrated location registration area TA0 is transmitted simultaneously not only from the terrestrial base stations 111 and 121 that constitute the first location registration area TA1, but also from the communication satellite 131 that constitutes the second location registration area TA2. Since the integrated location registration area TA0 is a large area and contains a large number of base stations and communication devices, the network load for transmitting the paging signal increases. In addition, as mentioned above, communication devices 2 are generally connected to terrestrial base stations 111 and 121 preferentially. In many areas, the possibility of a communication device 2 being connected to a communication satellite 131 is considered to be relatively low. It is not desirable to waste the limited power generated from sunlight by the solar panels mounted on the communication satellite 131 for transmitting paging signals, which are considered to have a relatively low probability of call success. The communication control apparatus 3 of this embodiment can efficiently transmit a paging signal to the communication devices 2E, 2F, 2G and 2H in the integrated location registration area TA0 including at least one terrestrial communication cell and at least one non-terrestrial communication cell.

The estimation unit 301 as a base station estimation unit estimates base stations to which the communication devices 2E, 2F, 2G and 2H in the integrated location registration area TA0 is connected. The estimation unit 301 can be configured in the similar way to the estimation unit 301 of the first embodiment shown in FIG. 3. The estimation unit 301 of the first embodiment estimates the connection status and/or location of the communication device 2F in the overlapping area OA. On the other hand, the estimation unit 301 of the present embodiment estimates the type of the connected base station (terrestrial base station 111, 121 or non-terrestrial base station 131) as the connection status of the communication devices 2E, 2F, 2G and 2H in the integrated location registration area TA0 which is not necessarily the overlapping area OA. In the similar way to the first embodiment, the estimation unit 301 of this embodiment may estimate other connection statuses and locations of communication devices 2E, 2F, 2G and 2H in the integrated location registration area TA0.

The estimation unit 301 estimates the type of the base stations to which the communication devices 2E, 2F, 2G and 2H in the integrated location registration area TA0, based on at least one of the following: performance information, frequency capability information, contract information, location information, communication status information, activity history information of the communication devices 2E, 2F, 2G and 2H in the integrated location registration area TA0, and activity history information of an unspecified number of communication devices 2 in the integrated location registration area TA0. These information indicating the type of base station to which the communication device 2E, 2F, 2G and 2H in the integrated location registration area TA0 can be obtained by the estimation unit 301 from the communication device 2 itself, the terrestrial base stations that constitute the first location registration area TA1, the non-terrestrial base stations that constitute the second location registration area TA2, the core network CN, any database 4 outside the wireless communication system 1 etc.

For example, performance information, frequency capability information, contract information, communication status information, activity history information of the communication devices 2 to be estimated, indicate capability and/or tendency of the communication device 2 for the terrestrial communication through the terrestrial base stations 111, 121 and the non-terrestrial communication through the non-terrestrial base stations 131 respectively, and provide useful suggestion regarding the type of the base station to which the communication device 2 is connected. In addition, since the location of the communication device 2 in the integrated location registration area TA0 can be detected or estimated, according to the location information of the communication device 2 to be estimated obtained from the LMF of the core network CN and/or the GPS module etc. of the communication device 2. Therefore, it is possible to estimate or determine that, the communication device 2E inside the first location registration area TA1 and outside the overlapping area OA is connected to the terrestrial base station 111, 121, and the communication device 2G and 2H inside the second location registration area TA2 and outside the overlapping area OA are connected to the non-terrestrial base station 131. For the communication device 2F in the overlapping area OA, the same as in the first embodiment, the estimation unit 301 estimates the type of the connected base station, by referring to the activity history information of an unspecified number of communication devices 2 obtained from the NWDAF in the core network CN and/or the database 4. The connection detection unit 302 detects the base station (its type) to which the communication devices 2E, 2F, 2G and 2H in the integrated location registration area TA0 are connected, while also referring to the estimation results of the estimation unit 301. The overlapping area identification unit 303 identifies the overlapping area OA of the first location registration area TA1 (terrestrial communication cells 112, 122) and the second location registration area TA2 (non-terrestrial communication cell 132), and detects the communication device 2F in the overlapping area OA.

The first paging control unit 309 causes base station of the one type of the terrestrial base station 111, 121 and the non-terrestrial base station 131 to transmit a first paging signal to the communication devices 2E, 2F, 2G and 2H, when it receives from the core network CN a call or a short message addressed to the communication device 2E, 2F, 2G and 2H in the integrated location registration area TA0 that includes at least one terrestrial communication cell 112, 122 and at least one non-terrestrial communication cell 132.

For example, as shown in the figure, the first paging control unit 309 causes the first paging signal to be transmitted from the terrestrial base stations 111, 121 (the first location registration area TA1). This first paging signal can successfully call the communication devices 2E, 2F etc. that are connected to the terrestrial base stations 111 and 121 in the first location registration area TA1. If the call by the first paging signal is successful, the transmission of the second paging signal from the communication satellite 131 described below becomes unnecessary, thus saving the limited power of the communication satellite 131. In addition, by having only some base stations included in the integrated location registration area TA0 transmit the first paging signal, the network load for transmitting the paging signal can be reduced.

The first paging control unit 309 may cause the first paging signal to be transmitted from the communication satellite 131 as the non-terrestrial base station (the second location registration area TA2). This first paging signal can successfully call the communication devices 2F, 2G, 2H etc. that are connected to the communication satellite 131 in the second location registration area TA2.

It is preferable for the first paging control unit 309 to cause the base station whose type was estimated by the estimation unit 301 and/or detected by the connection detection unit 302 to transmit the first paging signal. For example, it is recommended that the first paging signal be transmitted from terrestrial base stations 111, 121, in the case of calling the communication device 2E that is likely to be connected to the terrestrial base stations 111, 121 because it is within the first location registration area TA1 (terrestrial communication cells 112, 122) and outside the overlapping area OA. Similarly, it is recommended that the first paging signal be transmitted from the communication satellite 131, in the case of calling the communication device 2G or 2H that is likely to be connected to the communication satellite 131 because it is within the second location registration area TA2 (satellite communication cell 132) and outside the overlapping area OA.

When calling the communication device 2F located in the overlapping area OA of the first location registration area TA1 and the second location registration area TA2, the first paging signal is transmitted from the base station of the type (terrestrial base station 111, 121 or non-terrestrial base station 131) to which the communication device 2F is likely to be connected, based on the estimation result of the estimation unit 301 and/or the detection result of the connection detection unit 302, while the overlapping area identification unit 303 confirms that the communication device 2F is actually located in the overlapping area OA. The first paging control unit 309 may use the estimation result of the estimation unit 301 only when calling the communication device (such as 2F) in the overlapping area OA. As mentioned above, for communication devices outside the overlapping area OA (2E, 2G, 2H etc.) whose locations are recognized by GPS module etc., it is not necessary to estimate the type of the connected base station.

The second paging control unit 310 causes base station of the other type of the terrestrial base station 111, 121 and the non-terrestrial base station 131 to transmit a second paging signal to the communication devices 2E, 2F, 2G and 2H in the integrated location registration area TA0, when there is no response from the communication devices 2E, 2F, 2G and 2H to the first paging signal.

For example, as illustrated in the figure, if there is no response within a predetermined time to the first paging signal transmitted from the terrestrial base stations 111, 121 (the first location registration area TA1) by the first paging control unit 309, the second paging control unit 310 causes the communication satellite 131 (the second location registration area TA2) to transmit the second paging signal. This second paging signal can successfully call the communication devices 2F, 2G, 2H etc. connected to the communication satellite 131 in the second location registration area TA2.

If there is no response within a predetermined time to the first paging signal transmitted from the communication satellite 131 (the second location registration area TA2) by the first paging control unit 309, the second paging control unit 310 causes the terrestrial base stations 111, 121 (the first location registration area TA1) to transmit the second paging signal. This second paging signal can successfully call the communication devices 2E, 2F etc. connected to the terrestrial base stations 111, 121 in the first location registration area TA1.

The base station type recording unit 311 acquires from the connection detection unit 302 and records type of the base station to which the communication devices 2E, 2F, 2G and 2H in the integrated location registration area TA0 were connected immediately before their transition from communication state (also referred to as connection state) to non-communication state (also referred to as standby state). The first paging control unit 309 may cause the base station of the type recorded by the base station type recording unit 311 to transmit the first paging signal. The communication device 2 for which the type of the connected base station was recorded by the base station type recording unit 311 is considered to remain in the state that can be connected to the base station before the transition for at least a predetermined time after the transition to the standby state. Therefore, the success probability of the call by the first paging signal can be increased. In the case of a call before a predetermined time has passed after the recording by the base station type recording unit 311, the base station of the type recorded by the base station type recording unit 311 may transmit the first paging signal. In the case of a call after a predetermined time has passed after the recording by the base station type recording unit 311, the base station of the type based on the estimation result of the estimation unit 301 and/or the detection result of the connection detection unit 302 may transmit the first paging signal.

Figure 6:
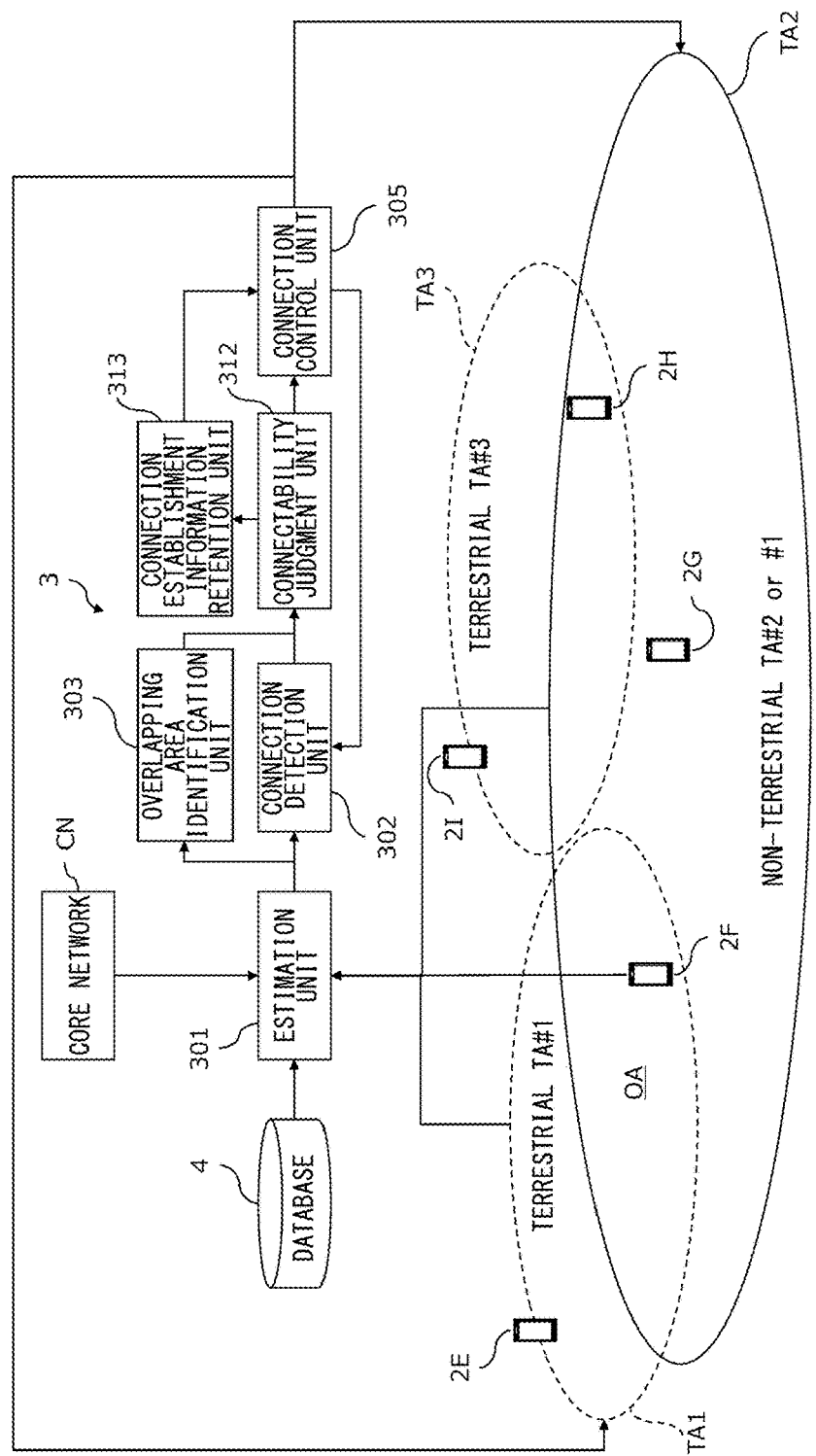
FIG. 6 is a functional block diagram of the communication control apparatus of the third embodiment.

FIG. 6 is a functional block diagram of the communication control apparatus 3 of the third embodiment. The communication control apparatus 3 comprises an estimation unit 301, a connection detection unit 302, an overlapping area identification unit 303, and a connection control unit 305 similar to those in the first embodiment (FIG. 3) and/or the second embodiment (FIG. 5), and additionally comprises a connectability judgment unit 312 and a connection establishment information retention unit 313. Duplicate descriptions of functional blocks common to the first embodiment and/or the second embodiment will be omitted.

In this embodiment, the first location registration area TA1, which is composed of terrestrial base stations 112 and 122, and the second location registration area TA2, which is composed of non-terrestrial base stations 132, are assigned different TAC "#1" and "#2" or the same TAC "#1". In other words, the first location registration area TA1 and the second location registration area TA2 may constitute different location registration areas as in the first embodiment, or may constitute one large integrated location registration area as in the second embodiment. Regardless of the configuration of the location registration area, this embodiment relates to the communication control in the overlapping area OA of the terrestrial communication cells 112, 122 (first location registration area TA1 etc.) and the non-terrestrial communication cell 132 (second location registration area TA2 etc.).

The communication device 2F in the overlapping area OA is connected to either a terrestrial base station 111, 121 providing a terrestrial communication cell 112, 122 or a communication satellite 131 providing a satellite communication cell 132. For example, while the communication device 2F in the overlapping area OA is connected to a terrestrial base station 111, 121, it is not connected to a communication satellite 131. In this state, if a communication failure due to a disaster or accident occurs in the terrestrial network (TN) to which the terrestrial base station 111, 121 belongs, the communication device 2F in the overlapping area OA that has become unconnectable to the TN tries to connect to the non-terrestrial network (NTN) to which the communication satellite 131 belongs. Such switching of the network to be connected to generally takes time because it involves checking the contract information of the communication device 2F and the network information of the communication carrier (For the TN, it may be a Public Land Mobile Network (PLMN) number) in the core network CN. In emergency situations such as when a disaster occurs, such a long network switching time may not be acceptable. The communication control apparatus 3 according to the present embodiment can shorten the network switching time in an overlapping area of terrestrial communication cell and non-terrestrial communication cell.

Among the functional blocks of the communication control apparatus 3 according to the present embodiment, the estimation unit 301, the connection detection unit 302, and the overlapping area identification unit 303 are similar to those of the first embodiment (FIG. 3) and/or the second embodiment (FIG. 5), so the duplicate description will be omitted.

The connectability judgment unit 312 makes a connectability judgment to other base station of the terrestrial base station 111, 121 and the non-terrestrial base station 131 for the communication device 2F connected to one base station of the terrestrial base station 111, 121 and the non-terrestrial base station 131 in the overlapping area OA of the terrestrial communication cell 112, 122 (first location registration area TA1) and non-terrestrial communication cell 132 (second location registration area TA2). The type of the one base station to which the communication device 2F in the overlapping area OA is connected is detected by the connection detection unit 302. For the communication device 2F that is detected to be connected to the terrestrial base station 111 and 121 by the connection detection unit 302, the connectability judgment unit 312 makes a connectability judgment to the communication satellite 131 as the other base station. On the other hand, for the communication device 2F that is detected to be connected to the communication satellite 131 by the connection detection unit 302, the connectability judgment unit 312 makes a connectability judgment to the terrestrial base station 111 and 121 as the other base station.

In this way, by making a connectability judgment to the other base station in advance, in the event of an unforeseen situation where the one base station becomes unconnectable, the communication device 2F can be quickly switched to the other base station. It is preferable that the connectability judgment unit 312 makes the connectability judgment of the communication device 2F to the other base station at a fixed or variable frequency and updates the connectability judgment result, in order to prevent the communication device 2F from unnecessarily trying to connect to the other base station when the other base station also becomes unconnectable.

The connection establishment information retention unit 313 retains the connection establishment information that establishes the connection between the communication device 2F and the other base station, when the communication device 2F in the overlapping area OA is judged to be connectable to the other base station by the connectability judgment unit 312. In the event of an unforeseen situation where the one base station becomes unconnectable, the communication device 2F in the overlapping area OA can quickly establish the connection to the other base station, utilizing the connection establishment information retained by the connection establishment information retention unit 313. The connection establishment information retention unit 313 may be implemented in the core network CN, the one base station before the switching, and the other base station after the switching. It is preferable to implement it in the communication device 2F itself so that the communication device 2F can quickly and proactively switch the connection destination.

When the connection establishment information retention unit 313 is provided outside the communication device 2F, the core network CN and/or the one base station before the switching notifies the communication device 2F of the location of the connection establishment information retention unit 313 and the fact that the connection establishment information to establish a connection with the other base station is retained there. The communication device 2F that receives this notification can recognize in advance that the connection destination is switched to the other base station, and can quickly establish a connection with the other base station based on the connection establishment information of the notified location in the event of an unforeseen situation.

The connection establishment information retention unit 313 may be located at least outside the core network CN, which eliminates the need to make time-consuming inquiries to the core network CN in order to switch the network to be connected to, thereby shortens the network switching time compared to the related art. It is preferable that the connection establishment information retention unit 313 updates the connection establishment information every time the connectability judgment unit 312 updates the connectability judgment result. When the result of the connectability judgment by the connectability judgment unit 312 is updated to "unconnectable to the other base station", the connection establishment information retention unit 313 may discard the retained connection establishment information, or may continue to retain the connection establishment information in preparation for the case where the result of the connectability judgment by the connectability judgment unit 312 is updated to "connectable to the other base station" again.

The connection control unit 305 causes the communication device 2F to be connected to the other base station (e.g. the communication satellite 131) that is judged to be connectable by the connectability judgment unit 312, based on the connection establishment information retained by the connection establishment information retention unit 313, when the communication device 2F in the overlapping area OA cannot be connected to the one base station (e.g. terrestrial base stations 111 and 121) to which it has been connected.

Figure 7:
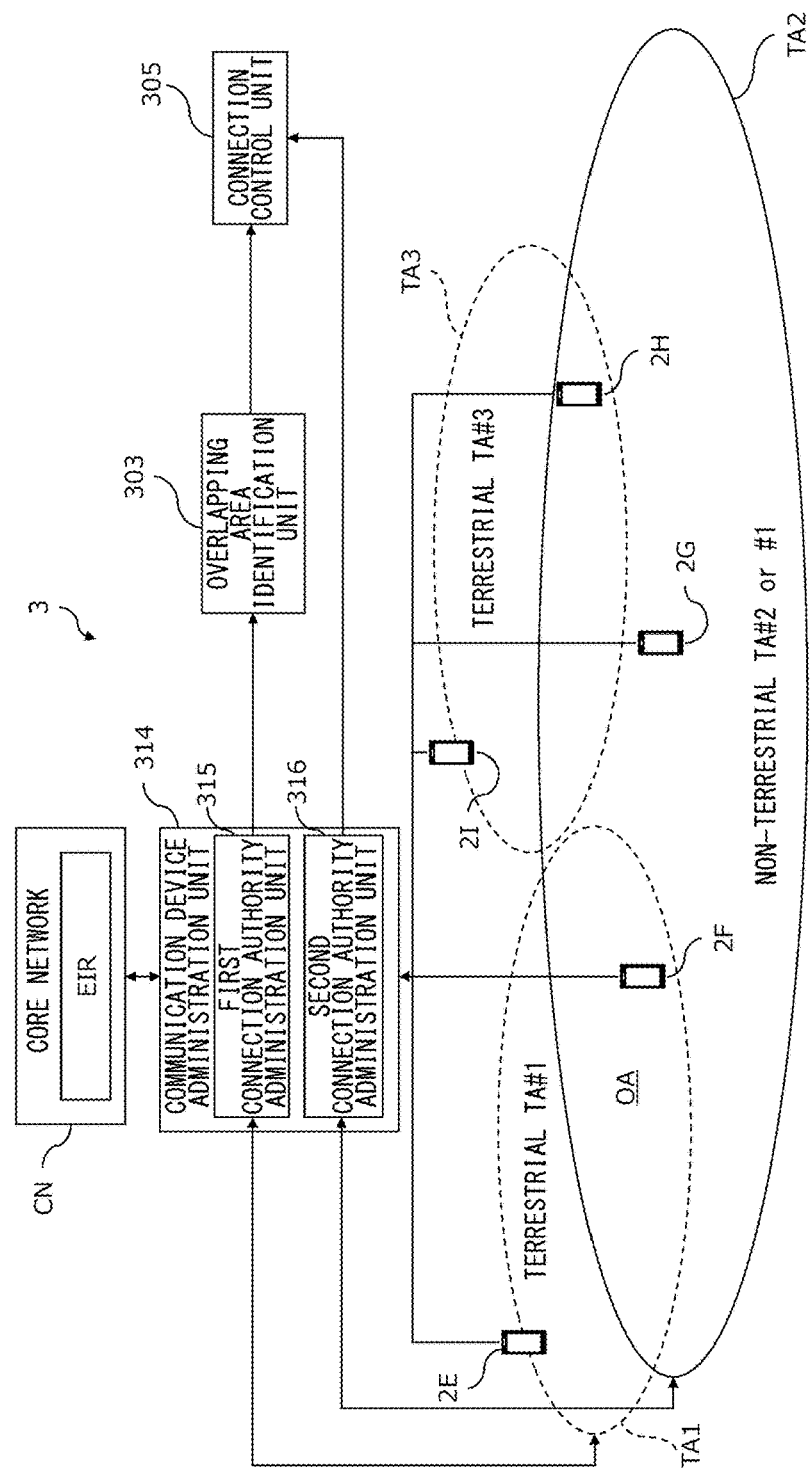
FIG. 7 is a functional block diagram of the communication control apparatus of the fourth embodiment.

FIG. 7 is a functional block diagram of the communication control apparatus 3 of the fourth embodiment. The communication control apparatus 3 comprises an overlapping area identification unit 303 and a connection control unit 305, similar to those in the first embodiment (FIG. 3), the second embodiment (FIG. 5) and/or the third embodiment (FIG. 6), and additionally comprises a communication device administration unit 314. Duplicate descriptions of functional blocks common to the first embodiment, the second embodiment and/or the third embodiment will be omitted.

In this embodiment, the first location registration area TA1, which is composed of terrestrial base stations 112 and 122, and the second location registration area TA2, which is composed of non-terrestrial base stations 132, are assigned different TAC "#1" and "#2" or the same TAC "#1". In other words, the first location registration area TA1 and the second location registration area TA2 may constitute different location registration areas as in the first embodiment (FIG. 3), or may constitute one large integrated location registration area as in the second embodiment (FIG. 5). Regardless of the configuration of the location registration area and/or the location of the communication device 2, this embodiment relates to the administration of the connection authority and the communication control of any communication devices 2 (such as communication devices 2E to 2I in FIG. 7) that can be connected to at least one type of communication cell of terrestrial communication cell 112, 122 (first location registration area TA1 etc.) and non-terrestrial communication cell 132 (second location registration area TA2 etc.).

Conventionally, an Equipment Identity Register (EIR) is provided in the core network CN to administrate the connection authority of communication devices 2 to the wireless communication system 1. The EIR is a database of communication devices 2 (UEs), and in addition to the communication device identification information or communication device ID, such as IMEI (International Mobile Equipment Identity), which identifies each communication device 2, the EIR also records whether or not each communication device 2 is authorized to connect to the wireless communication system 1 (especially terrestrial communication systems such as 5G wireless communication system 11), or its classification such as "White", "Black" or "Grey". For example, a "White" communication device 2 with connection authority is allowed to connect to the wireless communication system 1, while a "Black" communication device 2 without connection authority is prohibited from connecting to the wireless communication system 1. Also, a "Grey" communication device 2, whose connection authority is not yet determined, is registered in the EIR.

Since conventional EIRs are designed mainly for terrestrial communication systems such as 5G wireless communication system 11, they might not be suitable for wireless communication systems 1 where terrestrial communication systems and non-terrestrial communication systems such as satellite communication systems 13 coexist. For example, if the communication device 2F in the overlapping area OA of the first location registration area TA1, which is a part of the terrestrial communication system, and the second location registration area TA2, which is a part of the non-terrestrial communication system is classified as "White" in the EIR, it is unclear whether it has connection authority for both terrestrial communication system and non-terrestrial communication system or for one of them. Similarly, if the communication device 2F in the overlapping area OA is classified as "Black" in the EIR, it is unclear whether it does not have connection authority for both terrestrial communication system and non-terrestrial communication system or for one of them. The communication control apparatus 3 according to the present embodiment administrates the connection authority for each of the terrestrial communication system and non-terrestrial communication system individually.

The communication device administration unit 314 registers and administrates any communication devices 2 (such as communication devices 2E to 2I in FIG. 7) that can communicate with at least any of the terrestrial communication system and non-terrestrial communication system in the EIR or communication device specific information retention unit in the core network CN. The communication device administration unit 314 comprises a first connection authority administration unit 315 that registers and administrates a first connection authority (TN connection authority) of a communication device 2 to a terrestrial base station 111, 121 (terrestrial communication system/first location registration area TA1 etc.), and a second connection authority administration unit 316 that registers and administrates a second connection authority (NTN connection authority) of a communication device 2 to a non-terrestrial base station 131 (non-terrestrial communication system/second location registration area TA2 etc.).

FIG. 8 schematically shows the process by which the communication device administration unit 314 registers and administrates the communication device 2F in the EIR. In FIG. 7, the communication device 2F is in the overlapping area OA of the first location registration area TA1 and the second location registration area TA2. On the other hand in FIG. 8, the location of the communication device 2F when performing the registration process to the EIR is arbitrary, and the communication device 2F should be in any of the terrestrial communication cells 112, 122 and/or non-terrestrial communication cells 132 shown or not shown in FIG. 7, and be able to communicate with the radio access network (RAN) composed of terrestrial base stations 111, 121 and/or non-terrestrial base stations 131. The communication device 2F sends registration request to the access and mobility management function (AMF) in the core network CN via the RAN to which it is connected.

The AMF or the core network CN that has received the registration request from the communication device 2F refers to at least one of the following information: performance information, frequency capability information, contract information, location information, activity history information of the communication devices 2F and/or the legal and/or regulatory information in the region and/or country (location) where the communication device 2F is located, and then registers the TN connection authority for terrestrial communication systems and the NTN connection authority for non-terrestrial communication systems individually to the EIR. Here, the TN connection authority as the first connection authority is registered by the first connection authority administration unit 315, and the NTN connection authority as the second connection authority is registered by the second connection authority administration unit 316. In the example of FIG. 8, the TN connection authority and NTN connection authority of the communication device 2F are both registered as "White", therefore the communication device 2F can be connected to both the terrestrial communication system and the non-terrestrial communication system.

Even if the performance information, frequency capability information, contract information, activity history information etc. of a communication device 2 indicates that it is capable of connecting to or communicating with the satellite communication system 13 for example, there may be cases where connection or communication with the satellite communication system 13 is not legalized due to laws and/or regulations in the region or country where the communication device 2 is located. In such cases, the second connection authority administration unit 316 refers to the legal and/or regulatory information in the region or country where the communication device 2 is located, and registers in the EIR the NTN connection authority (second connection authority) of "Black", which means that the connection of the communication device 2 to the satellite communication system 13 is prohibited or "Grey", which means that such connection is not recommended. In the example shown in FIG. 8, the communication devices 2G, 2H, 2I etc. fall under this category.

The connection control unit 305 restricts the connection of the communication devices 2E, 2I with "Black" or "Grey" that does not have the "White" first connection authority (TN connection authority) to the terrestrial base station 111, 121 and restricts the connection of the communication devices 2G, 2H, 2I with "Black" or "Grey" that does not have the "White" second connection authority (NTN connection authority) to the non-terrestrial base station 131. For example, the communication device 2E in the example of FIGS. 7 and 8 is in the first location registration area TA1 (terrestrial communication cells 112 and 122), but the "Black" TN connection authority prohibits its connection to the terrestrial base stations 111 and 121. The communication device 2G is in the second location registration area TA2 (satellite communication cell 132), but the "Grey" NTN connection authority restricts its connection to the communication satellite 131. The communication device 2H is in overlapping area of the second location registration area TA2 (satellite communication cell 132) and the third location registration area TA3 (terrestrial communication cells 112 and 122), but the "Black" NTN connection authority prohibits its connection to the communication satellite 131, and its connection only to the terrestrial base stations 111 and 121 is allowed. The communication device 2I is in the third location registration area TA3 (terrestrial communication cells 112 and 122), but the "Grey" TN connection authority restricts its connection to the terrestrial base stations 111 and 121.

The communication device 2F in overlapping area OA of the first location registration area TA1 (terrestrial communication cells 112 and 122) and the second location registration area TA2 (satellite communication cell 132) is connectable to both the terrestrial base stations 111, 121 and the communication satellite 131 since both the TN connection authority and the NTN connection authority are "White". Such communication device 2F in the overlapping area OA is detected by the overlapping area identification unit 303. Then, the connection control unit 305 connects the communication device 2F to the terrestrial base stations 111, 121, if the communication device 2F in the overlapping area OA has the TN connection authority (first connection authority) of "White", regardless of its NTN connection authority (second connection authority). In this way, the limited communication resources (including power) of the communication satellite 131 can be saved by preferentially connecting the communication device 2F in the overlapping area OA to the terrestrial base stations 111 and 121. As a variant example, in the case where both the TN connection authority and the NTN connection authority of the communication device 2F are "White", the communication device 2F may be connected to the better one by comparing the communication quality of TN and NTN.

The connection control of each communication device 2 by the connection control unit 305 is initiated by the AMF in the core network CN, which receives a connection request from each of the communication devices 2, inquiring the TN connection authority and/or NTN connection authority of each of the communication devices 2 to the EIR. This inquiry from the AMF to the EIR is shown in FIG. 8 as "N5g-eir_MEIdentityCheck. In the example of FIG. 8, the result of the inquiry from the AMF to the EIR in response to the connection request from the communication device 2F shows that the TN connection authority and NTN connection authority are both "White".

As described above, the communication device 2F that is detected to be in the overlapping area OA by the overlapping area identification unit 303 is connected to the TN preferentially, therefore the AMF may first inquire only the TN connection authority (first connection authority) of the communication device 2F to the EIR. If the TN connection authority is "White" as a result of this inquiry, the AMF does not need to inquire the NTN connection authority (second connection authority) to the EIR, and the connection control unit 305 makes the communication device 2F connect to the terrestrial base station 111, 121. On the other hand, if the TN connection authority of the communication device 2F is "Grey" or "Black", the AMF shall The AMF inquires the EIR about the NTN connection authority (second connection authority). As a result of this inquiry, if NTN connection authority stronger than TN connection authority is confirmed (specifically, TN connection authority is "Grey" and NTN connection authority is "White", or, TN connection authority is "Black" and NTN connection authority is "Grey" or "White"), the connection control unit 305 connects the communication device 2F to the communication satellite 131.

In addition, for communication devices 2, such as the communication devices 2E, 2G and 2I in FIG. 7, which are in locations where they can be connected to only one of the TN and the NTN, the AMF may inquire the EIR about the connection authority only to such network (TN or NTN). Specifically, for the communication device 2E in terrestrial communication cells 112 and 122, the AMF may inquire the EIR only for TN connection authority, and for the communication device 2G in satellite communication cell 132, the AMF may inquire the EIR only for NTN connection authority, and for the communication device 2I in terrestrial communication cells 112 and 122, the AMF may inquire the EIR only for TN connection authority.

The present disclosure has been described above based on embodiments. It is understood by those skilled in the art that the embodiments are exemplary and that various variations are possible in the combination of each component and each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to communication control technology in communication system.

What is claimed is:

1. A communication control apparatus, comprising:
   an overlapping area identification unit that identifies an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
   a connection detection unit that detects that a communication device in the overlapping area is connected to one base station of the terrestrial base station and the non-terrestrial base station;
   a connection change restriction unit that restricts change of connection destination of the communication device from the one base station to another base station of the terrestrial base station and the non-terrestrial base station while the communication device is in the overlapping area;
   a connection history information retention unit that retains connection history information to the one base station, when the connection destination of the communication device in the overlapping area is changed from the one base station to the another base station; and
   an area change notification unit that generates an area change notification when the location registration area to which the communication device is connected is changed, and does not generate an area change notification when the connection destination of the communication device in the overlapping area is changed from the another base station to the one base station for which the connection history information is retained.

2. The communication control apparatus according to claim 1, wherein the connection change restriction unit rejects at least one request for changing the connection destination to the another base station received from the communication device in the overlapping area.

3. The communication control apparatus according to claim 1, wherein
the connection change restriction unit notifies the communication device in the overlapping area that the first location registration area or the second location registration area that includes the another base station is a transition prohibited area.

4. The communication control apparatus according to claim 1, wherein
the non-terrestrial base station is a communication satellite flying in outer space.

5. A communication control apparatus comprising:
an overlapping area identification unit that identifies an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
a connection history information retention unit that retains connection history information to the one base station, when the connection destination of the communication device in the overlapping area is changed from one base station to another base station of the terrestrial base station and the non-terrestrial base station; and
an area change notification unit that generates an area change notification when the location registration area to which the communication device is connected is changed, and does not generate an area change notification when the connection destination of the communication device in the overlapping area is changed from the another base station to the one base station for which the connection history information is retained.

6. A communication control method comprising:
identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
detecting that a communication device in the overlapping area is connected to one base station of the terrestrial base station and the non-terrestrial base station;
restricting change of connection destination of the communication device from the one base station to another base station of the terrestrial base station and the non-terrestrial base station while the communication device is in the overlapping area;
retaining connection history information to the one base station, when the connection destination of the communication device in the overlapping area is changed from the one base station to the another base station;
generating an area change notification when the location registration area to which the communication device is connected is changed; and
not generating an area change notification when the connection destination of the communication device in the overlapping area is changed from the another base station to the one base station for which the connection history information is retained.

7. A non-transitory computer-readable medium storing a communication control program causing a computer to perform:
identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
detecting that a communication device in the overlapping area is connected to one base station of the terrestrial base station and the non-terrestrial base station;
restricting change of connection destination of the communication device from the one base station to another base station of the terrestrial base station and the non-terrestrial base station while the communication device is in the overlapping area;
retaining connection history information to the one base station, when the connection destination of the communication device in the overlapping area is changed from the one base station to the another base station;
generating an area change notification when the location registration area to which the communication device is connected is changed; and
not generating an area change notification when the connection destination of the communication device in the overlapping area is changed from the another base station to the one base station for which the connection history information is retained.

8. A communication control method comprising:
identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
retaining connection history information to the one base station, when the connection destination of the communication device in the overlapping area is changed from one base station to another base station of the terrestrial base station and the non-terrestrial base station; and
generating an area change notification when the location registration area to which the communication device is connected is changed, and not generating an area change notification when the connection destination of the communication device in the overlapping area is changed from the another base station to the one base station for which the connection history information is retained.

9. A non-transitory computer-readable medium storing a communication control program causing a computer to perform:
identifying an overlapping area of a first location registration area including at least one terrestrial communication cell provided on the ground by a terrestrial base station installed on the ground and a second location registration area including at least one non-terrestrial communication cell provided on the ground by a flying non-terrestrial base station;
retaining connection history information to the one base station, when the connection destination of the communication device in the overlapping area is changed from one base station to another base station of the terrestrial base station and the non-terrestrial base station; and generating an area change notification when the location registration area to which the communication device is connected is changed, and not generating an area change notification when the connection destination of the communication device in the overlapping area is changed from the another base station to the one base station for which the connection history information is retained.

* * * * *